United States Patent
Ikegaya

(10) Patent No.: US 11,447,223 B2
(45) Date of Patent: Sep. 20, 2022

(54) CONTROL DEVICE FOR BATTERY OF MARINE VESSEL, CONTROL METHOD THEREFOR, AND MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 77 days.

(21) Appl. No.: 17/203,838

(22) Filed: Mar. 17, 2021

(65) Prior Publication Data
US 2021/0309335 A1    Oct. 7, 2021

(30) Foreign Application Priority Data

Apr. 2, 2020   (JP) .................... JP2020-066662

(51) Int. Cl.
  *B63H 21/20*   (2006.01)
  *B63H 21/17*   (2006.01)
(52) U.S. Cl.
  CPC ........... *B63H 21/20* (2013.01); *B63H 21/17* (2013.01); *B63H 2021/202* (2013.01)
(58) Field of Classification Search
  CPC ... B63H 21/20; B63H 21/17; B63H 2021/202
  See application file for complete search history.

(56) References Cited

U.S. PATENT DOCUMENTS

| | | | |
|---|---|---|---|
| 5,685,802 A | 11/1997 | Kanno | |
| 2014/0081500 A1 | 3/2014 | Ito et al. | |
| 2017/0282899 A1 | 10/2017 | Takizawa et al. | |
| 2017/0291672 A1* | 10/2017 | Maejima | ........... H02J 7/0048 |

FOREIGN PATENT DOCUMENTS

| | | |
|---|---|---|
| CN | 103332284 A | 10/2013 |
| CN | 103708015 A | 4/2014 |
| JP | 08-210160 A | 8/1996 |
| JP | 2012-161115 A | 8/2012 |
| JP | 2012-254691 A | 12/2012 |
| WO | 2012/114430 A1 | 8/2012 |

OTHER PUBLICATIONS

Official Communication issued in corresponding European Patent Application No. 21164601.3, dated Sep. 2, 2021.

* cited by examiner

*Primary Examiner* — Stephen P Avila
(74) *Attorney, Agent, or Firm* — Keating and Bennett, LLP

(57) ABSTRACT

A control device for a battery of a marine vessel recovers a power storage amount of a chargeable lithium ion battery while protecting the same. When an acquired power storage amount of the lithium ion battery becomes equal to or less than a first predetermined power storage amount, a switch to connect the lithium ion battery and a line or a load is turned off. While the switch is off, as an electric power balance on the line, a power inflow amount, a first power outflow amount, and a second power outflow amount are acquired. Based on the electric power balance acquired while the switch is off, whether a chargeable condition in which the lithium ion battery is chargeable is satisfied is determined. When the chargeable condition is satisfied, the switch is turned on.

18 Claims, 5 Drawing Sheets

CONTROL DEVICE FOR BATTERY OF MARINE VESSEL, CONTROL METHOD THEREFOR, AND MARINE VESSEL

CROSS REFERENCE TO RELATED APPLICATIONS

This application claims the benefit of priority to Japanese Patent Application No. 2020-066662 filed on Apr. 2, 2020. The entire contents of this application are hereby incorporated herein by reference.

BACKGROUND OF THE INVENTION

1. Field of the Invention

The present invention relates to a control device for a battery of a marine vessel, a control method therefor, and a marine vessel.

2. Description of the Related Art

In the field of hybrid vehicles, a technology for appropriately controlling charge and discharge of a battery is known. In the technology of International Publication WO 12/114430, electric power to be charged to and discharged from the battery is calculated based on a target driving force of a vehicle, a target output of an engine, and electric power losses of a plurality of motor generators. Accordingly, a control accuracy for charging the battery can be improved, and over-discharge and overload of the battery can be suppressed.

In addition, among the batteries, in particular, life and performance of lithium ion batteries are reduced by overcharge or over-discharge. For this reason, in general, lithium ion batteries are recommended to be used in a predetermined SOC range (for example, 90% to 10%).

In the field of marine vessels, a marine vessel in which any of an engine and a motor is capable of driving a propeller of a marine propulsion device is known. A method for effectively controlling the lithium ion battery mounted on such a marine vessel, however, is at an investigation stage, and there is room for improvement.

SUMMARY OF THE INVENTION

Preferred embodiments of the present invention appropriately recover a power storage amount of a lithium ion battery while protecting the lithium ion battery.

According to a preferred embodiment of the present invention, a control device for a battery of a marine vessel is configured or programmed to control a lithium ion battery mounted on the marine vessel. A propeller of a marine propulsion device of the marine vessel is driven by any of an engine and a motor. The lithium ion battery supplies electric power to drive the motor, and is chargeable by a generator. The electric power generated by the generator is supplied to charge the lithium ion battery, and the lithium ion battery is connected through a switch with a line to supply the electric power to another battery or a load that consumes the electric power. The control device includes a controller configured or programmed to control the switch. The controller is also configured or programmed to acquire a power storage amount of the lithium ion battery, turn off the switch when the power storage amount that has been acquired becomes equal to or less than a first predetermined power storage amount, acquire, while the switch is off, as an electric power balance on the line, a power inflow amount of the electric power generated by the generator into the line, a first power outflow amount from the line to the motor, and a second power outflow amount from the line to the another battery or the load, determine whether a chargeable condition in which the lithium ion battery is chargeable is satisfied based on the electric power balance that has been acquired while the switch is off, and turn on the switch when the chargeable condition is satisfied.

According to such a configuration, the switch is turned off when the power storage amount of the lithium ion battery becomes equal to or less than the first predetermined power storage amount, the power inflow amount to the line by the power generation by the generator, the first power outflow amount from the line to the motor, and the second power outflow amount from the line to another battery or the load are acquired as an electric power balance on the line while the switch is off, it is determined whether the chargeable condition that the lithium ion battery is chargeable is satisfied based on the electric power balance that has been acquired while the switch is off, and the switch is turned on when the chargeable condition is satisfied. That is, according to such a configuration, when the switch is turned off, over-discharge of a drive battery is avoided, and in addition, when the chargeable condition is satisfied and the switch is turned on, the power storage amount of the lithium ion battery is appropriately recovered.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
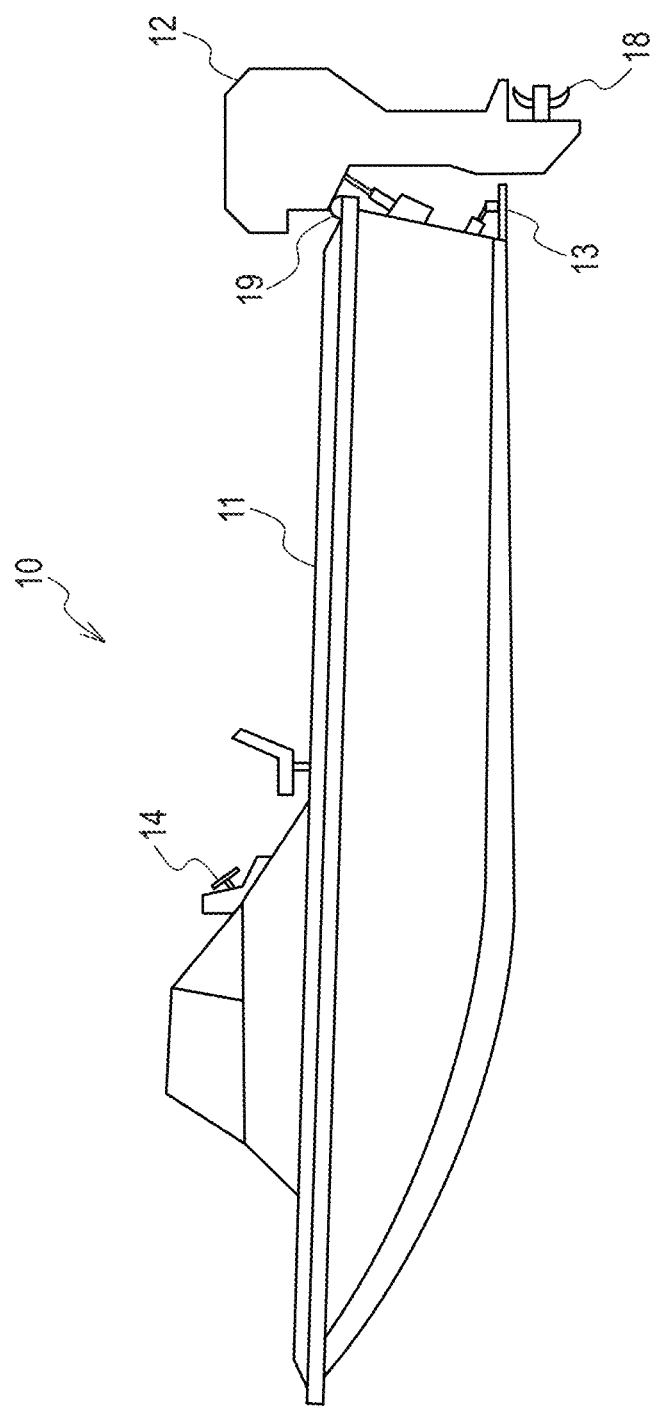
FIG. 1 is a side view of a marine vessel to which a controller of a battery is applied.

FIG. 1 is a side view of a marine vessel to which a controller of a battery is applied according to a preferred embodiment of the present invention. A marine vessel 10 is a planing boat, and includes a hull 11, a plurality of outboard motors 12 as marine propulsion devices mounted on the hull 11, and a plurality of trim tabs 13. A steering wheel 14 and an operation lever 32 (FIG. 2) to be described below are provided in the vicinity of a vessel steering seat of the hull 11.

The outboard motors 12 are attached to a stern of the hull 11 side by side. Each outboard motor 12 is attached to the hull 11 via a mounting unit 19, and rotates around a vertical or substantially vertical steering shaft in the mounting unit 19 in accordance with an operation on the steering wheel 14. Accordingly, the marine vessel 10 is steered. Each trim tab 13 is attached to the stern of the hull 11 and swings around a horizontal or substantially horizontal swing shaft at the stern. Accordingly, a lift generated at the stern of the hull 11 is adjusted to control the posture of the hull 11.

Each outboard motor 12 includes two drive sources. One drive source is an engine 23, which may be an internal combustion engine, and the other drive source is an electric motor 25 (hereinafter, simply referred to as a "motor 25"). Each outboard motor 12 obtains a propulsion force through a propeller 18 (propulsion blades) rotated by a driving force of the corresponding engine 23 or electric motor 25. That is, each outboard motor 12 is able to drive the propeller 18 with any of the engine 23 and the motor 25.

Figure 2:
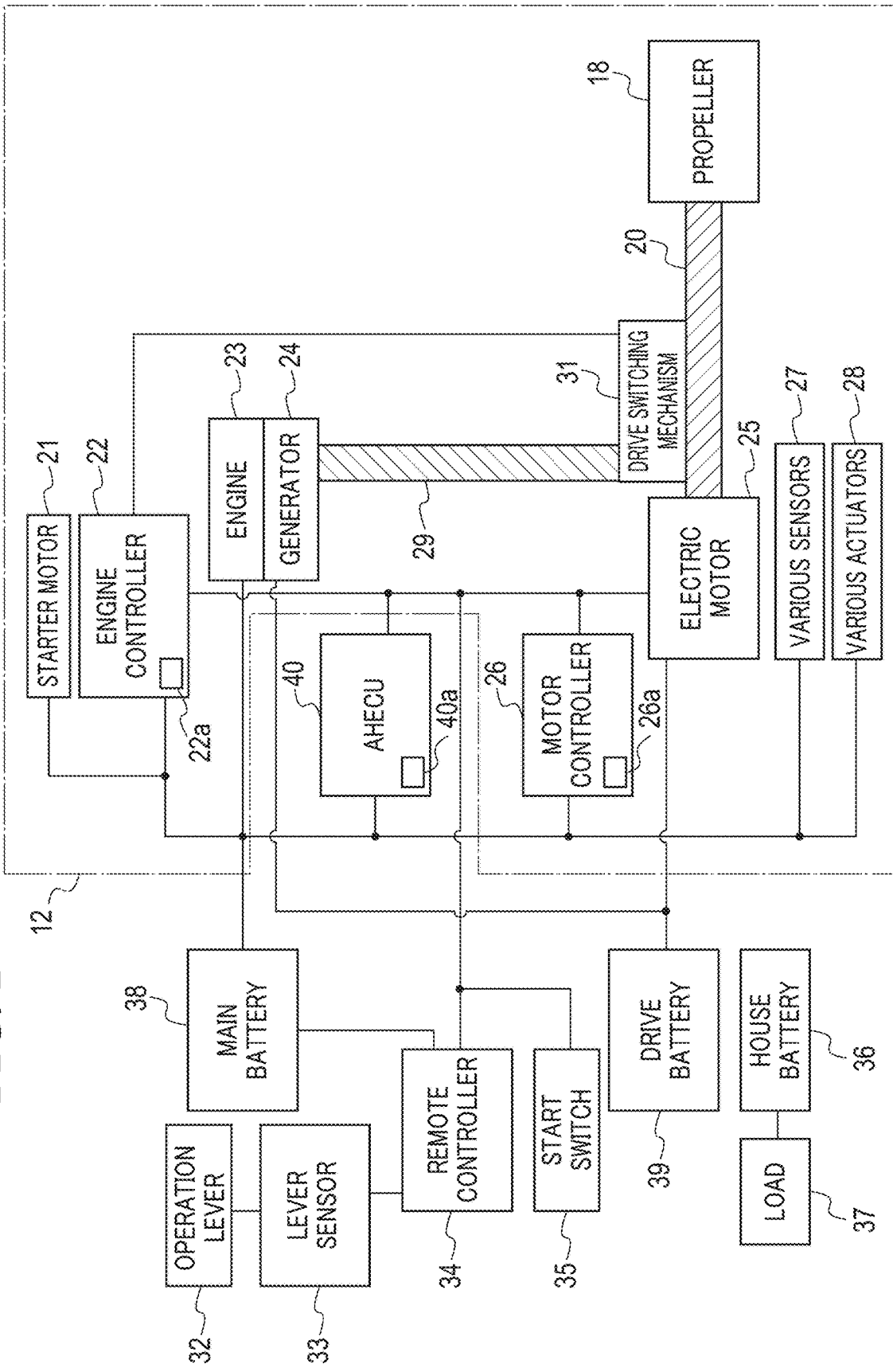
FIG. 2 is a block diagram showing an outboard motor and the related configuration.

FIG. 2 is a block diagram showing an outboard motor 12 and the related configuration. In FIG. 2, each block is connected by a CAN (Control Area Network), an analog signal line, or a power supply line. In particular, the controllers are connected with each other to enable CAN communication.

The outboard motor 12 includes a starter motor 21, an engine controller 22, an engine 23, a generator 24, a motor 25, a motor controller 26, various sensors 27, various actuators 28, and a drive switching mechanism 31. The drive switching mechanism 31 is coupled with the engine 23 through an engine drive shaft 29. The drive switching mechanism 31 is coupled with a propeller shaft 20 (propulsion shaft). A shaft of the motor 25 is coupled with the drive switching mechanism 31 and the propeller shaft 20. The propeller 18 is attached to the propeller shaft 20. The drive switching mechanism 31 includes a clutch mechanism, a shift mechanism, and the like, and switches a transmission source of the driving force to the propeller shaft 20 between the engine 23 and the motor 25.

The starter motor 21 starts the engine 23. The engine controller 22 controls the engine 23. The engine controller 22 changes an output of the engine 23 by controlling a throttle actuator and a fuel supply device. The generator 24 generates electric power using rotations of the engine 23. The motor controller 26 controls the motor 25. The various sensors 27 include a sensor to detect the number of rotations of the engine 23, a sensor to detect a throttle opening angle, and the like. An AHECU (Actuator Head ECU) 40 (a controller) acquires detection results of the various sensors 27 from each controller through the CAN. The various actuators 28 include a throttle actuator that changes an opening angle of a throttle valve, and the like. The AHECU 40 causes the corresponding controllers to control the various actuators 28 through the CAN.

The hull 11 includes the AHECU 40, the operation lever 32, a lever sensor 33, a remote controller 34, a start switch 35, a house battery 36, a load 37, a main battery 38, and a drive battery 39. It is to be noted that the AHECU 40 may be provided in each outboard motor 12, or may be provided in any of the plurality of outboard motors 12.

The main battery 38 supplies the electric power to the AHECU 40, the remote controller 34, the starter motor 21, the engine controller 22, the engine 23, the motor controller 26, the various sensors 27, the various actuators 28, and the like. The drive battery 39 supplies the electric power to the motor 25. The house battery 36 supplies the electric power to the load 37, such as a television, on the marine vessel. A combination of a power supply source and a power supply destination is not limited to the above examples.

The AHECU 40 includes a first holding unit 40a including a rewritable nonvolatile memory such as an EEPROM. The engine controller 22 and the motor controller 26 respectively include an engine memory 22a and a motor memory 26a as a second holding unit that is a rewritable nonvolatile memory.

The operation lever 32 is included in a remote controller unit (not shown), the lever sensor 33 detects an operation position of the operation lever 32, and sends a detection result to the remote controller 34. The remote controller 34 generates a request value of the throttle opening angle and a request torque based on the detection result acquired from the lever sensor 33, and outputs the request value and the request torque to the AHECU 40. The AHECU 40 sends the value received from the remote controller 34 to the engine controller 22 and the motor controller 26 as an output request. At that time, the AHECU 40 distributes the received value according to an operation situation or the like, and sends the distributed values to the engine controller 22 and the motor controller 26. The engine controller 22 drives the engine 23 in accordance with the received output request. The motor controller 26 drives the motor 25 in accordance with the received output request. When the AHECU 40 outputs an engine start instruction to the engine controller 22, the engine controller 22 causes the starter motor 21 to start the engine 23. In this case, the engine controller 22 drives a relay, and accordingly, the starter motor 21 obtains the electric power from the main battery 38, and starts the engine 23.

The start switch 35 may be positioned at an operation position of any of an OFF position, an ON position, and a START position by an operation of a vessel operator. When the vessel operator positions the start switch 35 at the START position and then releases a hand from the start switch 35, the start switch 35 automatically returns to the ON position. The START position is an operation position to activate the starter motor 21 and cause the AHECU 40 to store the fact that the activation of the starter motor 21 has been permitted. When a start permission instruction to permit the start of the engine 23 is input into the AHECU 40, the fact that the start of the engine 23 has been permitted is stored in the AHECU 40. Such storage is held until the start switch 35 is positioned at the OFF position.

It is to be noted that the configuration of the start switch 35 is not limited to this. For example, a main switch and a start/stop switch may be provided, and while the main switch is on, the start/stop switch may be operated to activate or stop activating the starter motor 21.

The second holding unit (the engine memory 22a and the motor memory 26a) stores second information (mode information and each instruction value). The mode information includes information indicating an operation mode to be described below. Each instruction value is a value to control the engine 23 or the motor 25. The engine memory 22a stores, as an instruction value to control the engine 23, at least one of an instruction value of a target number of rotations of the engine 23, an instruction value of a target torque of the engine 23, an instruction value of a shift position, an instruction value of the throttle opening angle, and a value indicating a failure state. The motor memory 26a stores, as an instruction value to control the motor 25, at least one of an instruction value of a target number of rotations of the motor 25, an instruction value of a target torque of the motor 25, a value indicating a drive state of the motor 25, and a value indicating a failure state.

The AHECU 40 integrally controls the main battery 38, the drive battery 39, and the house battery 36. It is to be noted that the function of the AHECU 40 may be provided in the engine controller 22 or the remote controller 34, and these controllers may be integrally controlled. Alternatively, instead of the AHECU 40, a battery controller to integrally control the respective batteries may be provided.

The operation mode of the outboard motor 12 will be described. The operation mode of the outboard motor 12 includes a stop mode, a motor drive mode (a first motor drive mode and a second motor drive mode), an engine mode, a first synchronization mode, and a second synchronization mode. The stop mode is a mode in which both the engine 23 and the motor 25 are stopped. The first motor drive mode is a mode in which the engine 23 is stopped and the propeller 18 is driven exclusively by the motor 25 with the electric power from the drive battery 39. The second motor drive mode is a mode in which the propeller 18 is driven exclusively by the motor 25 with the electric power from the drive battery 39, while the drive battery 39 is being charged by the electric power generated by the generator 24 due to operation of the engine 23. The engine mode is a mode in which the motor 25 is stopped and the propeller 18 is driven exclusively by the engine 23.

The first synchronization mode is a mode that the operation mode of the outboard motor 12 passes through when transitioning mutually between the stop mode, the first motor drive mode, the second motor drive mode, and the engine mode. The second synchronization mode is a mode that the operation mode of the outboard motor 12 passes through when transitioning mutually between the stop mode, the second motor drive mode, and the engine mode. The first synchronization mode and the second synchronization mode are provided to smooth the transition of the operation mode of the outboard motor 12, and are controlled according to the shift position, the number of rotations of the engine, the number of rotations of the motor, and the like. In the present preferred embodiment, there is no mode to drive the propeller 18 by using dynamic power of the engine 23 and dynamic power of the motor 25 in combination.

Figure 3:
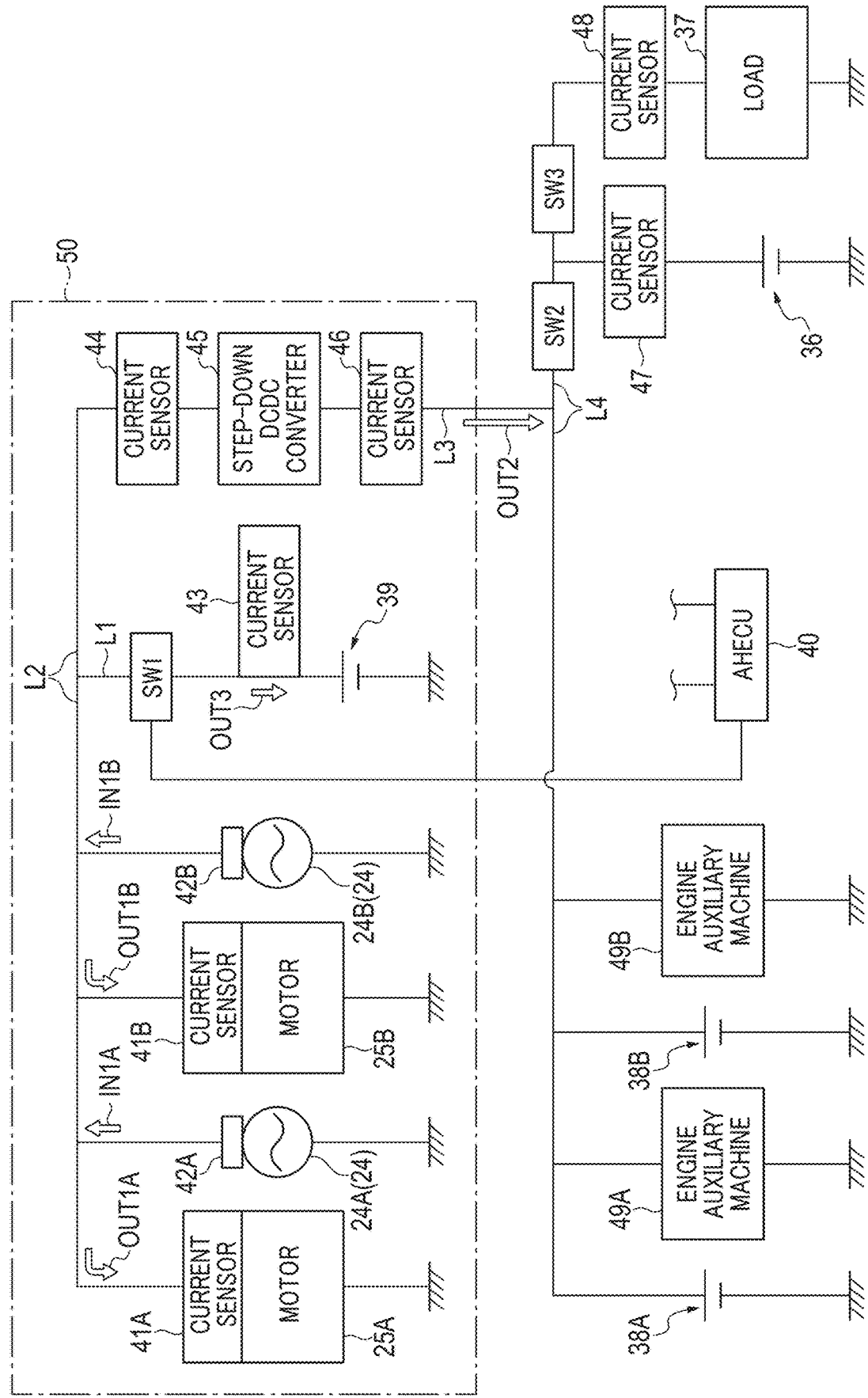
FIG. 3 is a block diagram showing the flow of electric power supply.

FIG. 3 is a block diagram showing the flow of the electric power supply. In the description of FIG. 3, a case in which the number of the outboard motors 12 is two is taken as an example. Accordingly, regarding the motor 25, the generator 24, and the main battery 38, motors 25A and 25B, generators 24A and 24B, and main batteries 38A and 38B are provided to respectively correspond to the two outboard motors 12. In addition, the engines 23 of the respective outboard motors 12 are provided with engine auxiliary machines 49A and 49B.

Both the main batteries 38A and 38B are lead batteries to supply the electric power to start the corresponding engines 23. The house battery 36 may be a lead battery. One drive battery 39 is provided in common for all (two in this example) the outboard motors 12. The drive battery 39 is preferably a lithium ion battery that supplies the electric power to drive the motors 25A and 25B. As an example, the rated voltages of the main batteries 38A and 38B and the house battery 36 are all 12 V, and the rated voltage of the drive battery 39 is 48 V. It is to be noted that the above rated voltages are not limited to those examples. For example, the rated voltage of the drive battery 39 may be 12 V or a high voltage such as 200 V. All the drive battery 39, the main batteries 38A and 38B, and the house battery 36 may be respectively charged by the generators 24A and 24B.

Power lines (lines L1 to L4 and the like) are shown in FIG. 3, and a portion of a signal line used by the AHECU 40 for the control is shown in FIG. 3. A high voltage unit 50 includes the drive battery 39, the motors 25A and 25B, the generators 24A and 24B, a step-down DCDC converter 45, current sensors 41A, 41B, 42A, 42B, 43, 44, and 46, and a switch SW1. The various sensors 27 (FIG. 2) include current sensors 41A, 41B, 42A, 42B, 43, 44, 46, 47, and 48. The various actuators 28 (FIG. 2) include the engine auxiliary machines 49A and 49B.

The drive battery 39 is connected with the line L2 through the line L1. The electric power generated by the generator 24 is supplied to charge the drive battery 39 through the line L2. The electric power generated by the generator 24 or the electric power of the drive battery 39 is supplied to the motors 25A and 25B through the line L2. The electric power generated by the generator 24 is supplied to charge the main batteries 38A and 38B and the house battery 36 through the lines L2, L3, and L4.

The AHECU 40 controls connection (ON)/disconnection (OFF) of switches SW1, SW2, and SW3. The switch SW1 is provided on the line L1. Accordingly, when the switch SW1 is in a connection state (ON state), electric current flows between the drive battery 39 and the line L2. The current sensor 44, the step-down DCDC converter 45, and the current sensor 46 are located between the line L2 and the line L3. The step-down DCDC converter 45 is an output that lowers a voltage on the line L2 and outputs the electric power to the line L3. The switches SW2 and SW3 are provided on the line L4. Therefore, when the switch SW2 is in an ON state, electric current flows from the step-down DCDC converter 45 to the house battery 36. Further, when the switch SW3 is in the ON state, electric current flows from the step-down DCDC converter 45 or the house battery 36 to the load 37. The load 37 is an example of a load unit that consumes the electric power.

The current sensors 41A and 41B are respectively provided on the motors 25A and 25B. The current sensors 41A and 41B respectively detect the electric current flowing between the line L2 and the motors 25A and 25B. The AHECU 40 calculates and acquires first power outflow amounts OUT1 (OUT1A and OUT1B) indicating electric power amounts respectively supplied from the line L2 to the motors 25A and 25B based on detection results of the current sensors 41A and 41B.

The current sensors 42A and 42B are respectively provided on the generators 24A and 24B. The current sensors 42A and 42B detect electric current respectively flowing from the generators 24A and 24B to the line L2. The AHECU 40 calculates and acquires power inflow amounts IN1 (IN1A and IN1B) indicating electric power amounts respectively flowing into the line L2 from the generators 24A and 24B based on detection results of the current sensors 42A and 42B. It is to be noted that the AHECU 40 may estimate and acquire the power inflow amounts IN1A and IN1B from the number of rotations of the corresponding engine 23.

The current sensors 44 and 46 detect electric current flowing from the step-down DCDC converter 45 through the line L3 to the line L4. The AHECU 40 calculates and acquires a second power outflow amount OUT2 indicating an electric power amount supplied from the step-down DCDC converter 45 to the line L4 based on a detection result of the current sensor 44 or 46. The second power outflow amount OUT2 is an electric power amount consumed via the step-down DCDC converter 45 (including the electric power amount used for charging), and is an electric power amount mainly supplied to the main batteries 38A and 38B, the engine auxiliary machines 49A and 49B, the house battery 36, the load 37, and the like. One of the current sensors 44 and 46 may be eliminated.

The AHECU 40 may acquire the second power outflow amount OUT2 by communication from the step-down DCDC converter 45. The AHECU 40 may acquire the first power outflow amount OUT1 by communication from the motor controller 26. In addition, the current sensor 47 is located between the house battery 36 and the line L4. The current sensor 48 is located between the load 37 and the line L4. The current sensor 43 is located between the drive battery 39 and the line L2.

The first power outflow amounts OUT1A and OUT1B are electric power amounts respectively consumed to drive the motors 25A and 25B. The second power outflow amount OUT2 is an electric power amount consumed by an element other than the high voltage unit 50. The power inflow amounts IN1A and IN1B respectively correspond to power generation amounts of the generators 24A and 24B. When the drive battery 39 is charged, an electric power amount indicated by a power outflow amount OUT3 is supplied from the line L2 to the drive battery 39. When the drive battery 39 is discharged, the electric power is supplied to the line L2 from the drive battery 39. In the case of discharging, since the flow of the electric current becomes opposite to that in the case of charging, the power outflow amount OUT3 becomes a negative amount.

Accordingly, an electric power balance X on the line L2 is calculated by Equation (1). The direction flowing into the line L2 (the direction of "incoming") is defined as plus. Here, assuming that the switch SW1 is set to a disconnection state (OFF state), the drive battery 39 is separated from the line L2, and the power outflow amount OUT3 becomes "0". Therefore, the electric power balance X is calculated by Equation (2).

$$X = IN1A + IN1B - OUT1A - OUT1B - OUT2 - OUT3 \quad (1)$$

$$X = IN1A + IN1B - OUT1A - OUT1B - OUT2 \quad (2)$$

Since the drive battery 39 is a lithium ion battery, its life and performance are reduced by overcharge or over-discharge. For this reason, it is desirable that the drive battery 39 should be used so that the power storage amount SOC (State of Charge), which is a residual capacity of the drive battery 39, is maintained within a predetermined SOC range (for example, 90% to 10%). For example, when the power storage amount SOC of the drive battery 39 is low and the line L2 is lower in voltage than the drive battery 39, the drive battery 39 may be over-discharged. Conversely, when the power storage amount SOC of the drive battery 39 is high and the line L2 is higher in voltage than the drive battery 39, the drive battery 39 may be overcharged. Thus, as will be described below, when the power storage amount SOC of the drive battery 39 is excessively reduced or excessively increased, the AHECU 40 performs a process to temporarily turn off the switch SW1, and then turn on the switch SW1 when a condition suitable for charging or discharging is satisfied.

Figure 4:
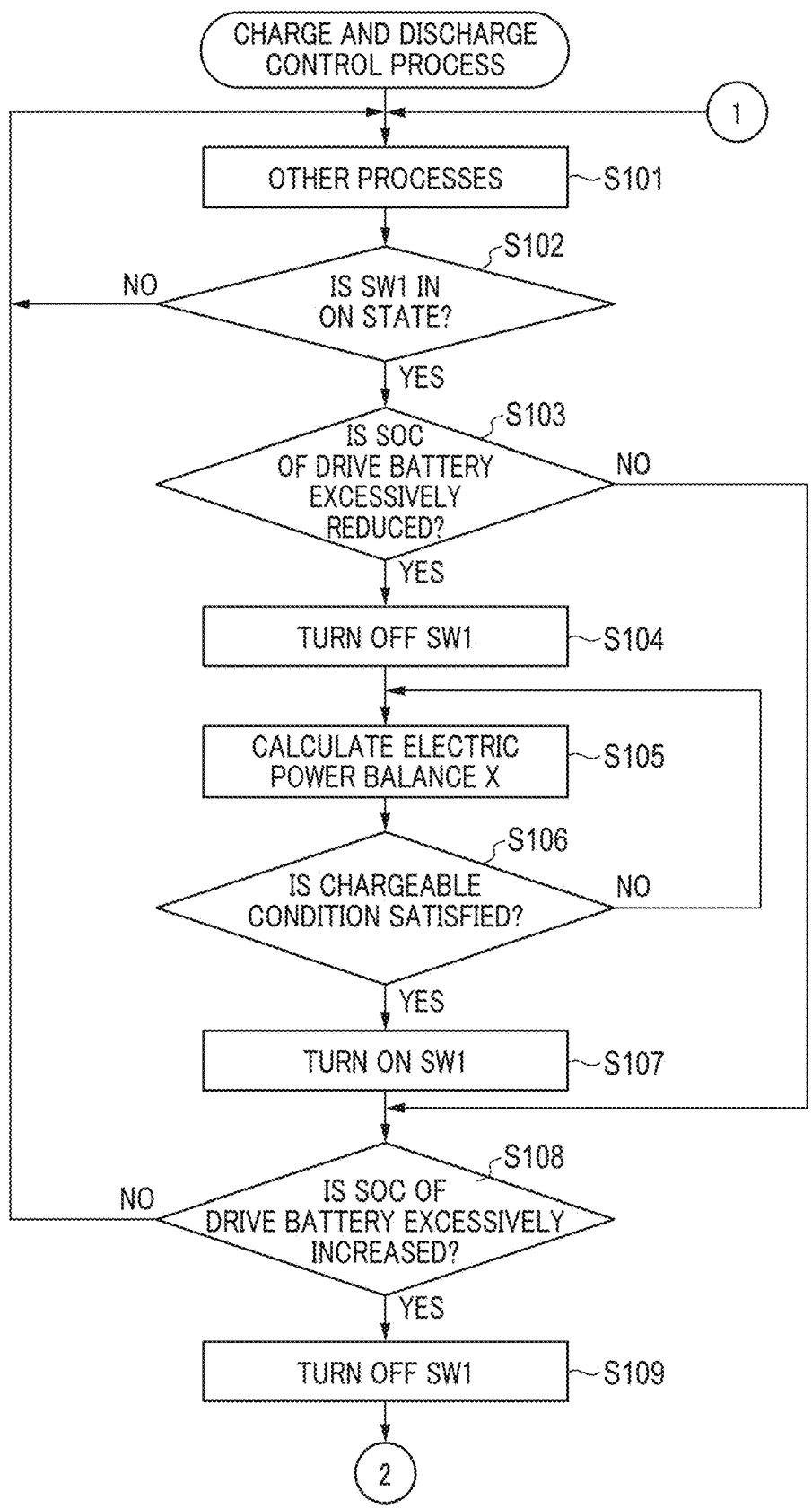
FIG. 4 is a flowchart showing a charge and discharge control process.
Figure 5:
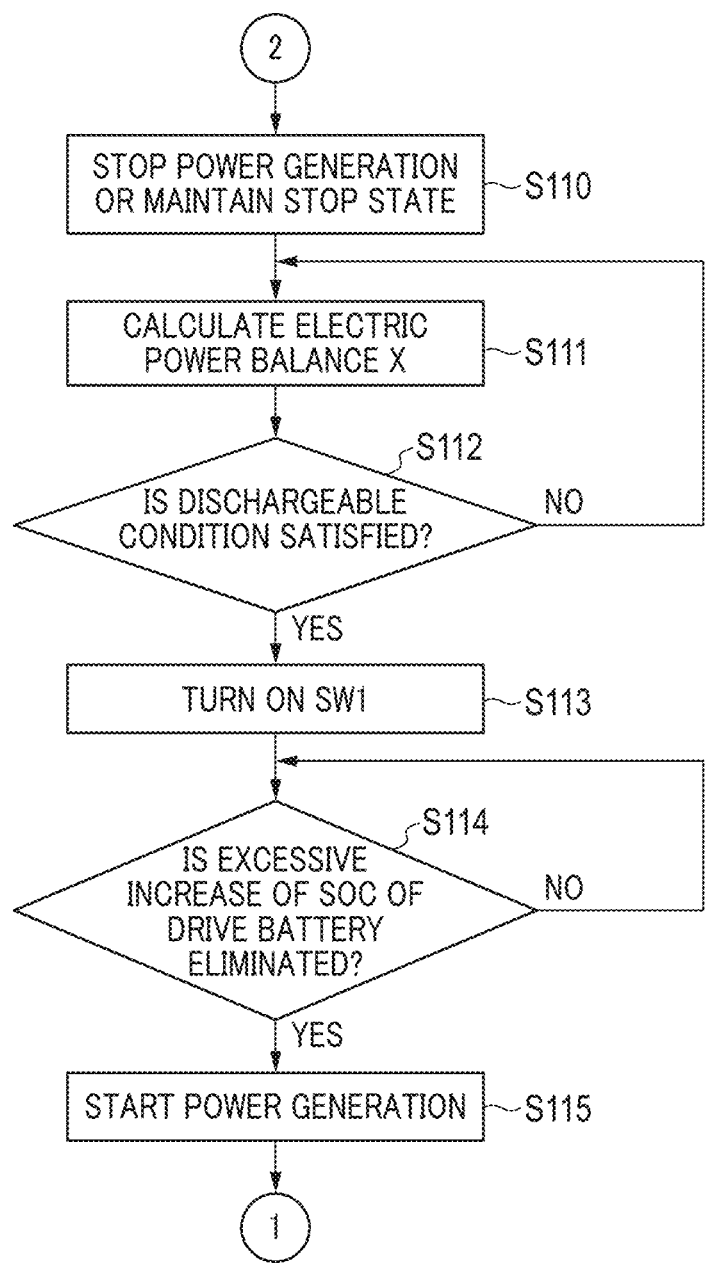
FIG. 5 is a subsequent flowchart of FIG. 4 showing the charge and discharge control process.

FIGS. 4 and 5 are flowcharts showing a charge and discharge control process. This process is achieved by the AHECU 40 running a control program stored beforehand in a storage unit (not shown) in a RAM (not shown) and executing the control program. This process is started when a main power source is turned on. In the present process, the AHECU 40 always acquires the power storage amount SOC of the drive battery 39 by monitoring the power outflow amount OUT3. It is to be noted that a method to acquire the power storage amount SOC does not matter.

In step S101, the AHECU 40 performs "other processes". In the "other processes" mentioned here, for example, various processes corresponding to settings and operations in a setting operation unit (not shown) are performed. The "other processes" also include a process of ending the process of the present flowchart based on an end instruction.

In step S102, the AHECU 40 determines whether the switch SW1 is in the ON state. When the switch SW1 is in the OFF state, the AHECU 40 returns the process to step S101. When the switch SW1 is in the ON state, the AHECU 40 determines whether the power storage amount SOC of the drive battery 39 is excessively reduced, in step S103. The excessive reduction here means that, for example, the power storage amount SOC becomes equal to or less than a first predetermined power storage amount SOC1 (SOC≤SOC1). The first predetermined power storage amount SOC1 is about 30%, as an example, without being limited to this value.

When the power storage amount SOC of the drive battery 39 is not excessively reduced as a result of the determination in step S103, the AHECU 40 advances the process to step S108. When the power storage amount SOC of the drive battery 39 is excessively reduced, the AHECU 40 turns the switch SW1 to the OFF state in step S104. Accordingly, since the drive battery 39 is separated from the line L2, when the power storage amount SOC of the drive battery 39 is excessively reduced, a further reduction of the power storage amount SOC is avoided.

Subsequently, in step S105, the AHECU 40 calculates the electric power balance X on the line L2 by the above Equation (2). A smoothed value obtained by filtering a signal to eliminate a peak value is adopted for an electric power amount and an electric current amount used in the calculation of the electric power balance X. In step S106, the AHECU 40 determines whether a predetermined "chargeable condition", which is defined beforehand as a condition that the drive battery 39 is able to be charged, is satisfied from the electric power balance X calculated in step S105. Here, the chargeable condition means that when the switch SW1 is turned on, it is estimated that the electric power is supplied from the line L2 to the drive battery 39, that is, it is estimated that the power outflow amount OUT3 becomes a positive amount. Specifically, the electric power balance X is greater than a first predetermined value TH1 (TH1<X). The first predetermined value TH1 is defined as a value equal to or greater than 0, and is stored beforehand in a memory such as the first holding unit 40a or the like. The first predetermined value TH1 is, for example, a value obtained by adding a margin value α to θ.

As a result of the determination in step S106, when the chargeable condition is not satisfied, the AHECU 40 returns the process to step S105, waits for a certain period of time, and calculates the electric power balance X again. On the other hand, when the chargeable condition is satisfied, the AHECU 40 turns the switch SW1 to the ON state in step S107. Accordingly, charge of the drive battery 39 is started.

In step S108, the AHECU 40 determines whether the power storage amount SOC of the drive battery 39 is excessively increased. The excessive increase here means that, for example, the power storage amount SOC becomes equal to or greater than a second predetermined power storage amount SOC2, which is equal to or greater than the first predetermined power storage amount SOC1 (SOC2 SOC). The second predetermined power storage amount SOC2 is 80%, as an example, without being limited to this value.

When the power storage amount SOC of the drive battery 39 is not excessively increased as a result of the determination in step S108, the AHECU 40 returns the process to step S101. When the power storage amount SOC of the drive battery 39 is excessively increased, the AHECU 40 turns the switch SW1 to the OFF state in step S109. Accordingly, since the drive battery 39 is separated from the line L2, when the power storage amount SOC of the drive battery 39 is excessively increased, a further increase of the power storage amount SOC is avoided.

Subsequently, in step S110, the AHECU 40 stops the power generation by the generators 24A and 24B. Thus, the electric power balance on the line L2 is lowered early. It is to be noted that depending on the operation mode, the generators 24A and 24B have stopped the power generation in some cases. In such cases, the AHECU 40 maintains a power generation stop state of the generators 24A and 24B.

In step S111, the AHECU 40 again calculates the electric power balance X on the line L2 by the above Equation (2). At this stage, since the generators 24A and 24B are in the power generation stop state and the power inflow amounts IN1A and IN1B are 0, the electric power balance X is substantially determined by the first power outflow amounts OUT1A and OUT1B and the second power outflow amount OUT2. In step S112, the AHECU 40 determines whether a predetermined "dischargeable condition", which is defined beforehand as a condition that the drive battery 39 is able to be discharged, is satisfied from the electric power balance X calculated in step S111.

Here, the dischargeable condition means that when the switch SW1 is turned on, it is estimated that the electric power is discharged from the drive battery 39 to the line L2, that is, it is estimated that the power outflow amount OUT3 becomes a negative amount. Specifically, the electric power balance X is smaller than a second predetermined value TH2 (X<TH2). The second predetermined value TH2 is defined as a value equal to or smaller than 0, and is stored beforehand in a memory such as the first holding unit 40a or the like. The second predetermined value TH2 is, for example, a value obtained by subtracting a margin value $\beta$ from 0.

As a result of the determination in step S112, when the dischargeable condition is not satisfied, the AHECU 40 returns the process to step S111, waits for a certain period of time, and calculates the electric power balance X again. On the other hand, when the dischargeable condition is satisfied, the AHECU 40 turns the switch SW1 to the ON state in step S113. Accordingly, discharge of the drive battery 39 is started.

In step S114, the AHECU 40 waits until the excessive increase of the power storage amount SOC of the drive battery 39 is eliminated (SOC<SOC2). Then, when the excessive increase of the power storage amount SOC of the drive battery 39 is eliminated, the AHECU 40 permits start of the power generation by the generators 24A and 24B in step S115. Therefore, when necessary depending on the operation mode, the power generation by the generators 24A and 24B is restarted. Subsequently, the AHECU 40 returns the process to step S101.

According to the present preferred embodiment, when the power storage amount SOC of the drive battery 39 becomes equal to or less than the first predetermined power storage amount SOC1, the AHECU 40 turns off the switch SW1 (S104). In addition, while the switch SW1 is off, the AHECU 40 acquires the electric power balance X on the line L2 by the above Equation (2), and turns on the switch SW1 when the chargeable condition is satisfied based on the electric power balance X (S107). Accordingly, over-discharge of the drive battery 39 is avoided. Therefore, the power storage amount SOC of the drive battery 39 is recovered appropriately while protecting the drive battery 39, which is a lithium ion battery.

Since the chargeable condition satisfies TH1<X and the margin value $\alpha$ is considered in the first predetermined value TH1 (0+the margin value $\alpha$), over-discharge of the drive battery 39 is avoided with a margin.

When the power storage amount SOC of the drive battery 39 becomes equal to or greater than the second predetermined power storage amount SOC2 (SOC2 SOC), the AHECU 40 turns off the switch SW1, and also sets the generator 24 to the power generation stop state (S109 and S110). Accordingly, over-discharge of the drive battery 39 is avoided, and wasteful power generation by the generator 24 is also suppressed.

Since the AHECU 40 turns the switch SW1 to the ON state when the dischargeable condition is satisfied (S113), the charge is able to be restarted while avoiding overcharge of the drive battery 39. Additionally, since the dischargeable condition satisfies X<TH2 and the margin value $\beta$ is considered in the second predetermined value TH2 (0–the margin value $\beta$, the charge of the drive battery 39 is appropriately restarted with a margin.

After the switch SW1 is turned on because the dischargeable condition is satisfied, the power generation by the generator 24 is started when the power storage amount SOC of the drive battery 39 becomes less than the second predetermined power storage amount SOC (SOC<SOC2) (S115). Thus, after the drive battery 39 is in a chargeable state, the power generation by the generator 24 is restarted appropriately.

Heretofore, while the present invention has been described in detail with reference to preferred embodiments thereof, the present invention is not limited to these specific preferred embodiments, but also includes various preferred embodiments and modifications thereof without departing from the scope and spirit of the present invention.

It is to be noted that a switch SW to interrupt the electric current flowing through the step-down DCDC converter 45 may be provided on the line L2 or the line L3 so that the AHECU 40 may control ON/OFF of the switch SW. When the switch SW is in the OFF state, the second power outflow amount OUT2 becomes zero. This eliminates the need to measure the second power outflow amount OUT2. Therefore, when acquiring the electric power balance X on the line L2 in step S105 or the like, the AHECU 40 is able to calculate the electric power balance X by substituting 0 in the second power outflow amount OUT2 in the above Equation (2).

The generator 24 is mounted on the engine 23 in general, but the generator 24 may be mounted on the hull 11.

The number of the outboard motors 12 provided on the marine vessel 10 may be one, or three or more. The trim tab 13 may not necessarily be provided.

Marine vessels to which preferred embodiments of the present invention are applied is not limited to a marine vessel including an outboard motor, and may be a marine vessel including another type of marine propulsion device, such as an inboard/outboard motor (stern drive, inboard motor/outboard drive), an inboard motor, a water jet drive, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control device for a battery of a marine vessel, the control device being configured or programmed to control a lithium ion battery mounted on the marine vessel in which a propeller of a marine propulsion device of the marine vessel is driven by any of an engine and a motor, the lithium ion battery supplies electric power to drive the motor and is chargeable by a generator, electric power generated by the generator is supplied to charge the lithium ion battery, and the lithium ion battery is connected through a switch with a line to supply the electric power to another battery or a load that consumes the electric power, the control device comprising:
- a controller configured or programmed to control the switch and to:
  - acquire a power storage amount of the lithium ion battery;
  - turn off the switch when the power storage amount that has been acquired becomes equal to or less than a first predetermined power storage amount;
  - acquire, while the switch is off, as an electric power balance on the line, a power inflow amount of the electric power generated by the generator into the line, a first power outflow amount from the line to the motor, and a second power outflow amount from the line to the another battery or the load;
  - determine whether a chargeable condition in which the lithium ion battery is chargeable is satisfied based on the electric power balance that has been acquired while the switch is off; and
  - turn on the switch when the chargeable condition is satisfied.

2. The control device according to claim 1, wherein the chargeable condition satisfies an inequality:
(the power inflow amount)−(the first power outflow amount)−(the second power outflow amount)>(a first predetermined value), in which the first predetermined value is equal to or greater than 0.

3. The control device according to claim 1, wherein the controller is configured or programmed to acquire a detection result, as the first power outflow amount, of a current sensor provided on the motor.

4. The control device according to claim 1, wherein the controller is configured or programmed to acquire a detection result, as the second power outflow amount, of a current sensor provided on an output that outputs the electric power from the line to the another battery or the load.

5. The control device according to claim 1, wherein the controller is configured or programmed to acquire a power generation amount, as the power inflow amount, of the generator estimated by a number of rotations of the engine or a detection result of a current sensor provided on the generator.

6. The control device according to claim 1, wherein the controller is configured or programmed to turn off the switch and set the generator to a power generation stop state when the power storage amount becomes equal to or greater than a second predetermined power storage amount that is greater than the first predetermined power storage amount.

7. The control device according to claim 6, wherein, after the controller turns off the switch and sets the generator to the power generation stop state, the controller is configured or programmed to acquire the electric power balance, to determine, based on the acquired electric power balance, whether a dischargeable condition in which the lithium ion battery is dischargeable is satisfied, and to turn on the switch when the dischargeable condition is satisfied.

8. The control device according to claim 7, wherein the dischargeable condition satisfies an inequality:

(the power inflow amount)−(the first power outflow amount)−(the second power outflow amount)<(a second predetermined value), in which the second predetermined value is equal to or smaller than 0.

9. The control device according to claim 7, wherein, after the controller turns on the switch because the dischargeable condition is satisfied, the controller is configured or programmed to cause the generator to start power generation when the power storage amount that has been acquired becomes less than the second predetermined power storage amount.

10. The control device according to claim 1, wherein the another battery is chargeable by the generator, and includes at least one of a battery to supply the electric power to start the engine and a battery to supply the electric power to the load on the marine vessel.

11. A control method for a battery of a marine vessel to control a lithium ion battery mounted on the marine vessel in which a propeller of a marine propulsion device of the marine vessel is driven by any of an engine and a motor, the lithium ion battery supplies electric power to drive the motor and is chargeable by a generator, electric power generated by the generator is supplied to charge the lithium ion battery, and the lithium ion battery is connected through a switch with a line to supply the electric power to another battery or a load that consumes the electric power, the control method comprising:
- acquiring a power storage amount of the lithium ion battery;
- turning off the switch when the power storage amount that has been acquired becomes equal to or less than a first predetermined power storage amount;
- acquiring, while the switch is off, as an electric power balance on the line, a power inflow amount of the electric power generated by the generator into the line, a first power outflow amount from the line to the motor, and a second power outflow amount from the line to the another battery or the load;
- determining whether a chargeable condition in which the lithium ion battery is chargeable is satisfied based on the electric power balance that has been acquired while the switch is off; and
- turning on the switch when the chargeable condition is satisfied.

12. The control method according to claim 11, wherein the chargeable condition satisfies an inequality:
(the power inflow amount)−(the first power outflow amount)−(the second power outflow amount)>(a first predetermined value), in which the first predetermined value is equal to or greater than 0.

13. The control method according to claim 11, further comprising:
acquiring a detection result, as the first power outflow amount, of a current sensor provided on the motor.

14. The control method according to claim 11, further comprising:
acquiring a detection result, as the second power outflow amount, of a current sensor provided on an output that outputs the electric power from the line to the another battery or the load.

15. The control method according to claim 11, further comprising:
acquiring a power generation amount, as the power inflow amount, of the generator estimated by a number of rotations of the engine or a detection result of a current sensor provided on the generator.

16. The control method according to claim 11, further comprising:
turning off the switch and setting the generator to a power generation stop state when the power storage amount becomes equal to or greater than a second predetermined power storage amount that is greater than the first predetermined power storage amount.

17. The control method according to claim 11, wherein the another battery is chargeable by the generator, and includes at least one of a battery to supply the electric power to start the engine and a battery to supply the electric power to the load on the marine vessel.

18. A marine vessel comprising:
a control device;
a marine propulsion device including a propeller to be driven by any of an engine and a motor; and
a lithium ion battery to supply electric power to drive the motor and being chargeable by a generator; wherein
electric power generated by the generator is supplied to charge the lithium ion battery, and the lithium ion battery is connected through a switch with a line to supply the electric power to another battery or a load that consumes the electric power; and
the control device includes a controller configured or programmed to control the switch and to:
acquire a power storage amount of the lithium ion battery;
turn off the switch when the power storage amount that has been acquired becomes equal to or less than a first predetermined power storage amount;
acquire, while the switch is off, as an electric power balance on the line, a power inflow amount of the electric power generated by the generator into the line, a first power outflow amount from the line to the motor, and a second power outflow amount from the line to the another battery or the load;
determine whether a chargeable condition in which the lithium ion battery is chargeable is satisfied based on the electric power balance that has been acquired while the switch is off; and
turn on the switch when the chargeable condition is satisfied.

* * * * *